United States Patent [19]
Demidov et al.

[11] Patent Number: 4,980,978
[45] Date of Patent: Jan. 1, 1991

[54] METHOD AND APPARATUS FOR DRYING THERMOSENSITIVE MATERIALS

[75] Inventors: Sergei F. Demidov; Valery V. Molochnikov; Vladimir V. Babin; Anatoly N. Mangush; Sergei P. Skladanovsky; Gennady N. Smykov, all of Stavropol; Jury V. Martynov, Moscow; Elena A. Rudakova, late of Moscow, all of U.S.S.R., Alexei N. Rudakova, administrator

[73] Assignee: Institut Problem Mekhaniki Akademi, etc., Moscow, U.S.S.R.

[21] Appl. No.: 283,488

[22] PCT Filed: Feb. 24, 1987

[86] PCT No.: PCT/SU87/00025
§ 371 Date: Oct. 24, 1988
§ 102(e) Date: Oct. 24, 1988

[87] PCT Pub. No.: WO88/06409
PCT Pub. Date: Sep. 7, 1988

[51] Int. Cl.$^5$ ............................................. F26B 3/00
[52] U.S. Cl. ......................................... 34/9; 34/181
[58] Field of Search ................... 34/9, 57 A, 181, 182, 34/10, 57 R

[56] References Cited
U.S. PATENT DOCUMENTS
3,518,777 7/1970 Kono .

FOREIGN PATENT DOCUMENTS
2745179 4/1979 Fed. Rep. of Germany ........ 34/181

Primary Examiner—Henry A. Bennet
Attorney, Agent, or Firm—Lilling and Lilling

[57] ABSTRACT

A method of drying thermosensitive materials includes spraying such materials onto inert bodies circulating about a closed space in a flow of a heat-transfer agent at an increased temperature. In the upper part of the flow of the heat-transfer agent, occupying not more than $\frac{1}{3}$ of its cross section, the heat transfer agent is rotated at an axial velocity 2 to 3 times higher than the velocity of the heat transfer agent in the rest of the flow. An apparatus for carrying out this method has a cylindrical chamber with a tapered bottom accommodating axially of the chamber a blind tube with a base defining with the walls of the bottom an annular passage for introducing a heat transfer agent thereto. The chamber has a mesh and a propeller mixer secured thereunder on a shaft arranged at an angle of 60°–90° to the axis of the chamber at a distance from this axis which is less than R, where R is the radius of the chamber.

12 Claims, 1 Drawing Sheet

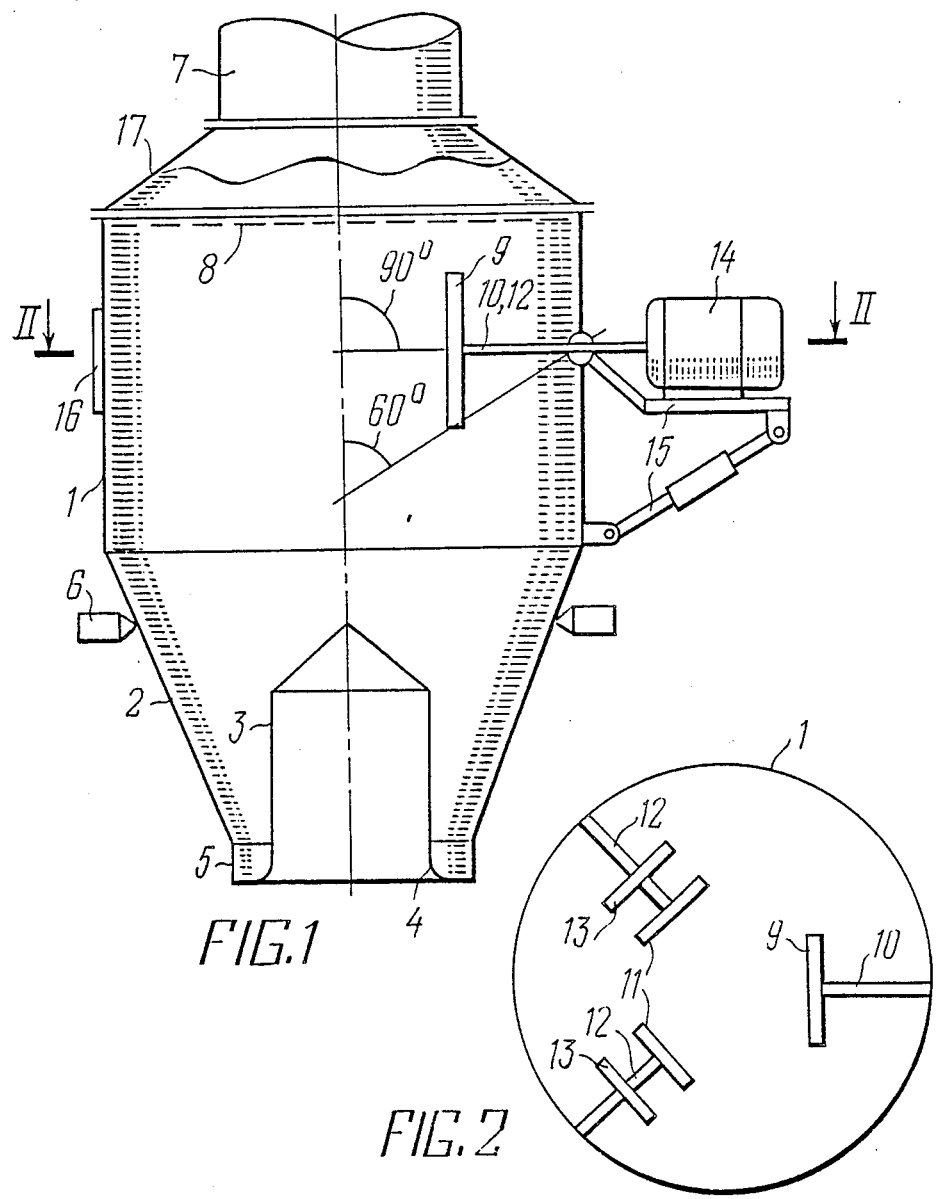

METHOD AND APPARATUS FOR DRYING THERMOSENSITIVE MATERIALS

BACKGROUND OF THE INVENTION

1. Field of the Invention

This invention relates to methods of drying thermosensitive materials and apparatus for carrying out the methods.

DESCRIPTION OF THE PRIOR ART

There are known apparatus for drying thermosensitive materials, for example an apparatus with a fluidized bed (cf., Stabnikov V. N., et al, "Protsessy i apparaty pischevykh proizvodstv" Moscow, the Agropromizdat Publishers, 1985, p. 360).

The apparatus comprises two chambers arranged one above the other and separated by a gas distribution grid. The upper chamber is connected to a gas outlet pipe, a hopper for a moist material to be dried, and a pipe for discharging the dry material.

The moist material is fed from the hopper onto the gas distribution grid. Hot gases forced through the holes in the grid from the lower to the upper chamber at a high velocity act to keep the material in a fluidized state. The dry material is evacuated through the discharge pipe.

This prior art apparatus features a rather low capacity, since during drying thermosensitive materials the temperature of the heat-transfer agent should not be too high, as the product being dried tends to burn. Conversely, drying at low temperatures necessitates a longer contact of the material with the heat-transfer agent and affects the quality of the end product.

There is also known a method of drying thermosensitive materials in a fluidized bed (cf., Sazhin B. S. "Osnovy tekhniki sushki", Moscow, the Khimia Publishers, 1984, p. 91).

A moist material is admitted from a charging hopper to a chamber, where it is entrained by a heat-transfer agent fed through axial nozzles.

In this chamber the material circulates until the dry particles, being lighter in weight, are carried by the heat-transfer agent to a cyclone.

This method, however, fails to obtain a high quality material with uniform moisture content throughout its mass, because the particles of the material travel different paths. The method also fails to dry suspensions and paste-like materials having high moisture content.

There is also known a method of drying thermosensitive materials and an apparatus for carrying out the method (cf., USSR Inventor's Certificate No. 1,192,764, Int. Cl. A 23 B 5/02, published Oct. 17, 1984).

The method involves spraying thermosensitive materials onto inert bodies circulating about a closed space in a flow of heat-transfer agent at a temperature below the temperature of decomposition of such materials.

The apparatus for carrying out the method comprises a cylindrical chamber having an outlet pipe and a tapered bottom in which there is arranged axially of the chamber a blind tube having a base defining with the walls of the bottom an annular passage whereto the heat-transfer agent is admitted. The walls of the chamber accommodate nozzles for feeding moist thermosensitive materials to the chamber.

These methods and apparatus are disadvantageous, since they fail to yield an end product of high quality with low moisture content through the mass of the material.

The method is impossible to carry out continuously for drying highly adhesive materials, and for this reason it is characterized by low efficiency.

SUMMARY OF THE INVENTION

The present invention aims to provide a method of drying thermosensitive materials by preselecting optimum thermal and gas-dynamic conditions, as well as to provide an apparatus for carrying out the method, through arranging inside the housing additional elements ensuring high quality of the dry thermosensitive materials of various adhesive capacities and high efficiency of the drying process.

The aims of the invention are attained in the proposed method of drying thermosensitive food products by spraying such products onto inert bodies circulating about a closed space in a flow or stream of heat-transfer agent at increased temperatures. According to the invention, in the upper part of the flow occupying not more than $\frac{1}{3}$ of the horizontal cross-section of the flow, the heat-transfer agent is rotated at an axial velocity 2–3 times higher than the velocity of the heat-transfer agent in the rest of the flow.

Carrying out the drying process under such conditions makes it possible to provide within a short period of time highly uniform drying of the thermosensitive materials of various adhesive capacity, while preventing their tendency to burn and decompose. In consequence, the method ensures high quality of the end product, while considerably intensifying the drying process.

In order to speed up the process of drying and retain the quality of the dry material, it is advisable to carry out the process in a flow of heat-transfer agent fed at a rate of 21–27 m/s and a temperature of 220°–260° C. with the temperature gradient being maintained lengthwise of the flow at 120–150 K/m; or, alternatively, at a rate of feeding the heat-transfer agent of 14–19 m/s and a temperature of 170°–190° C. with the temperature gradient being maintained lengthwise of the flow at 90–120 K/m.

For attaining the maximum efficiency of the drying process it is desirable that the time of circulation of the inert bodies amounting to a volumetric fraction 0.2–0.25 be within a range of 2 to 3 seconds.

The aims of the invention are further attained by an apparatus for drying thermosensitive food products comprising a cylindrical chamber with an outlet pipe, a tapered bottom and nozzles for feeding a thermosensitive material, the bottom of the chamber having arranged axially with the chamber a blind tube with a base defining with the walls of the bottom of the chamber an annular passage for introducing a heat-transfer agent thereto. According to the invention, the cylindrical chamber has at the side of the outlet pipe a mesh and a propeller mixer disposed under the mesh and secured on a shaft arranged at an angle of 60°–90° to the axis of the chamber and at a distance from this axis which is less than R, where R is the radius of the chamber.

The apparatus allows considerable invigoration or the drying process due to the provision of zones, where the inert bodies move at a higher speed. Such zones ensure favorable conditions of spalling the dry material of high adhesive capacity.

Preferably, the shaft of the propeller mixer is spaced from the axis of the chamber at a distance of 0.6–0.7 R, whereas the distance from the shaft of the mixer to the mesh is within 0.65–0.75 R, the diameter of the blades of the propeller mixer being 0.4–0.5 R.

For a more uniform spraying of the thermosensitive material onto the inert bodies, the nozzles for spraying this material are arranged about the perimeter of the tapered bottom of the chamber at the upper portion of the bottom.

Alternatively, several additional propeller mixers on shafts can be arranged under the mesh about the perimeter of the cylindrical chamber, each such shaft can also carry two mixers. Such an arrangement ensures uniform admission of the inert bodies to the zones of increased velocities of the heat-transfer agent and provides favorable conditions for spalling the dry material without affecting the quality of the material.

Described hereinbelow are various preferred examples for carrying out the method of drying thermosensitive materials according to the invention.

EXAMPLE 1

A heat-transfer agent, such as clean air, heated to a temperature of 260° C. and fed to the heating zone at a rate of 27 m/s ensures that inert bodies present therein and having a volumetric fraction of 0.20 recirculate about a closed space for 2.3 seconds. The inert bodies have the form of fluoroplastic cubes with edge length of 3 mm. The heat-transfer agent in the upper portion of the flow occupying ⅓ of its horizontal cross-section is rotated at an axial velocity of 54 m/s. The temperature gradient lengthwise of the flow is maintained at 150 K/m. A moist material having high adhesive properties and dry matter content of 29 mass per cent heated to a temperature of 50° C. is sprayed onto the inert bodies circulated in the flow of heat-transfer agent. The inert bodies entering the zone of rotational movement of the heat-transfer agent having a speed exceeding the free-fall velocity are caused to vigorously interact. This gives rise to spalling of the dry material and for the material carried by the heat-transfer agent to be evacuated from the drying zone.

Due to the action of centrifugal forces, the inert bodies return to the flow of the heat-transfer agent to continue circulation about the closed space.

The end product is then separated from the heat-transfer agent. The content of dry matter in the end product is 96 mass per cent. The amount of moisture evacuated from the material in the course of drying amounts to 61 kg/h. Solubility of the end product is 0.6 ml of wet sediment.

EXAMPLE 2

A heat-transfer agent, viz., clean air, heated to a temperature of 190° C. is fed to the drying zone at a rate of 19 m/s to ensures that inert bodies occupying 0.25 of the volume of the drying zone circulate about the closed volume for 2.5 seconds. The inert bodies are generally fluoroplastic cubes with 5 mm edge size. The heat-transfer agent in the upper portion of its flow occupying ⅓ of its horizontal cross section is rotated at an axial velocity of 57 m/s. The temperature gradient lengthwise of the flow is maintained at 120 K/m. The Feblu concentrate having the initial dry matter content of 18.5 mass per cent and having high adhesive capacity is heated to 70° C. to be sprayed onto the inert bodies circulating in the flow of heat-transfer agent. While entering the zone of rotational movement of the heat-transfer agent exceeding in flow speed the free-fall velocity of the inert bodies, the inert bodies tend to vigorously interact. This results in spalling of the dry product, and it is carried from the drying zone by the heat-transfer agent. The inert bodies return to the flow of heat-transfer agent to recommence circulation due to the action of centrifugal forces. The end product is separated from the heat-transfer agent. It contains 95.4 mass per cent dry matter. The amount of moisture removed from the material during drying is 96.4 kg/h. The solubility of the end product is 0.65 of wet sediment.

EXAMPLE 3

A heat-transfer agent, viz., clean air heated to a temperature of 220° C. and fed to the drying zone at a rate of 21 m/s ensures that the inert bodies of 0.2 volumetric fraction present therein are recirculated about a closed space for 2 seconds. The inert bodies are fluoroplastic cubes of 4 mm edge length. The heat-transfer agent in the upper portion of its flow occupying ¼ of its horizontal cross section is rotated at an axial velocity of 42 m/s. The temperature gradient lengthwise of the flow is maintained at 120 K/m. Whole milk substitute heated to a temperature of 70° C. is sprayed onto the inert bodies circulating in the flow of heat-transfer agent. The inert bodies entering the zone of rotational movement of the heat-transfer agent having a speed exceeding the free-fall velocity of the inert bodies are caused to vigorously interact. Spalling of the dry product takes place, and the dry product is evacuated from the drying zone by the heat-transfer agent. By virtue of the centrifugal forces the inert bodies are returned again to the flow of heat-transfer agent to continue circulation about the closed space. The end product is separated from the heat-transfer agent, and its quality is tested for solubility to preferably be 0.7 ml wet sediment. The end product contains 98 mass per cent dry matter. The amount of moisture removed from the material after drying is 145 kg/h.

EXAMPLE 4

A heat-transfer agent, viz., clean air heated to a temperature 170° C. and fed to the drying zone at a rate of 14 m/s provides that the inert bodies present therein and having a volumetric fraction of 0.25 circulate about a closed space for 3 seconds. The inert bodies are generally fluoroplastic cubes measuring 3 mm in edge length. The heat-transfer agent in the upper portion occupying ⅓ of its horizontal cross section is rotated at an axial velocity of 42 m/s. The temperature gradient is maintained lengthwise of the flow at 90 K/m. A substitute of whole milk heated to a temperature 70° C. is sprayed onto the inert bodies circulating in the flow of heat-transfer agent. The inert bodies entering the zone of rotational movement of the heat-transfer agent having a velocity exceeding the free-fall velocity thereof are caused to vigorously interact. This causes spalling of the dry product and the product is carried out of the drying zone by the flow of heat-transfer agent. The end product is separated from the heat-transfer agent to be checked for quality in terms of solubility amounting to 0.72 ml of wet sediment. The end product contains 97 mass per cent dry matter. The amount of moisture removed from the material after drying amounts to 120 kg/h.

Thanks to the action of centrifugal forces on the inert bodies, the latter are returned to the flow of heat-transfer agent to continue circulation in the closed space.

BRIEF DESCRIPTION OF THE DRAWINGS

The present invention will be more fully understood from a more detailed description of an apparatus for carrying out the proposed method with reference to the accompanying drawings, in which:

FIG. 1 is a schematic representation of an apparatus for drying thermosensitive materials according to the invention; and FIG. 2 is a section taken along the line I—I in FIG. 1.

DESCRIPTION OF THE PREFERRED EMBODIMENT

The proposed apparatus for drying thermosensitive materials with reference to FIG. 1 comprises a cylindrical chamber 1 with a tapered bottom 2 accommodating axially of the chamber a blind tube 3 having a base 4 defining with the walls of the bottom 2 an annular passage 5 for tangentially introducing a heat-transfer agent.

Arranged about the perimeter of the tapered bottom 2 in its upper portion are nozzles 6 for spraying the thermosensitive material onto inert bodies. Such an arrangement of the nozzles 6 ensures feeding of the material to the zone of the maximum temperature of the heat-transfer agent.

The moist material is heated and dried without its properties being affected. The thermosensitive material starts drying at a temperature insignificantly exceeding the temperature of adiabatic evaporation of clean liquid. Fast rate drying proceeds under soft conditions. The process of drying is considerably intensified with the aforedescribed arrangement of the nozzles 6.

At the side opposite to the tapered bottom 2 the cylindrical chamber 1 is provided with an outlet pipe 7 for evacuating the dry material by the flow or stream of the heat transfer agent.

The chamber 1 has at the side of the outlet pipe 7 a mesh 8 overlying a propeller mixer 9 secured on a shaft 10 arranged at an angle of 60° to 90° to the longitudinal axis of the chamber 1 and at a distance from this axis which is less than R, where R is the radius of the chamber 1. In order to maintain the most favorable conditions for the drying process to proceed, it is preferable that the shaft 10 of the propeller mixer 9 be spaced from the longitudinal axis of the chamber 1 at a distance 0.6 to 0.7 R, the distance from the shaft 10 to the mesh 8 be within a range of 0.65 to 0.75 R, whereas the diameter of the propeller mixer 9 be 0.4 0.5 R. Alternatively, several additional propeller mixers 11 can be arranged on shafts 12 (FIG. 2), preferably a pair of such mixers 11, 13 per each shaft 12. The diameter of the blades of all these mixers 11, 13 is advisably less than the diameter of one mixer 9, whereas the area of accelerated speed of the flow of the heat-transfer agent in the upper portion of the cylinder is not to be in excess of ⅓ of the horizontal cross section of the flow.

The shafts 10, 12 are connected to a motor 14 secured to the wall of the chamber 1 by means of brackets 15. The chamber 1 has an inlet pipe 16 for charging inert bodies thereto, and a cover cap 17. The apparatus operates in the following manner. Inert bodies in the form of fluoroplastic cubes having edges 2–5 mm in length are charged through the intake pipe 16 to the interior of the chamber 1. A heat-transfer agent, viz., clean air heated to a temperature 170°–260° C., is fed along the annular passage 5 at a rate of 14 to 27 m/s.

The flow of heat-transfer agent formed by the blind tube 3 and walls of the tapered bottom 2 and chamber 1 acts to elevate the inert bodies, which initiate circulation about the closed space. By adjusting the feed rate of the heat-transfer agent circulation of the inert bodies is maintained within 2 to 3 sec. Desirably, the temperature of the heat-transfer agent is invariable at the outlet of the pipe 7, so that the temperature gradient lengthwise of the flow would be 90–150 K/m.

The mixer 9 secured on the shaft 10 is rotated by the motor 14. This mixer produces, at the top of the flow of heat-transfer agent, occupying not more than ⅓ of its horizontal cross section, an area of increased speed of the heat-transfer agent exceeding the free-fall velocity of the inert bodies. The axial velocity of the heat-transfer agent in this area exceeds by 2 to 3 times its speed in the rest of the flow. As the movement of the inert bodies is stabilized, the nozzles 6 are engaged to spray onto the inert bodies a thermosensitive food product preliminarily heated to a temperature not exceeding its decomposition temperature. The thermosensitive material is carried on the inert bodies by the flow of heat-transfer agent to the zone of the propeller mixer 9. While passing the blades of the mixer 9, the inert bodies tend to collide therewith to result in spalling of part of the dry material.

In addition, having attained an accelerated velocity and curvilinear path of travel in this area, the inert bodies initiate vigorous mutual interaction and engagement with the mesh 8 to result in further spalling of the dry material. Under the action of centrifugal forces the inert bodies are thrown to the periphery of the chamber 1 at a high velocity to travel downwards and then again be elevated by the flow of heat-transfer agent.

The spalled particles of the dry product are evacuated by the flow of heat-transfer agent from the apparatus. Thereafter, the dry product is separated from the heat-transfer agent the heat-transfer agent being recyclable back to the apparatus.

In the absence of rotation of the flow of heat-transfer agent the inert bodies would have been left pressed to the wall, since the velocity of the flow is higher than the free-fall velocity of these inert bodies.

The propeller mixer 9 is so disposed as to reduce the residence time of the thermosensitive material in the drying zone upon attaining thereby a desired moisture content.

This prevents burned taste and denaturation of thermosensitive food products, and, in other words, improves the quality of the dry product.

This is especially important when drying highly adhesive materials. The blades of the mixer 9 and mesh 8 ensure favorable conditions for such a material to spall and be evacuated from the drying zone.

The provision of several additional propeller mixers 11 mounted on shafts 12 about the perimeter of the chamber 1 ensures a more uniform passage of the inert bodies through the zone where the velocity of the flow of heat-transfer agent is high.

In the case of mounting a pair of mixers 11, 13 on one shaft 12 a pulse resulting from rotation of the mixers is continuously transmitted to the flow of heat-transfer agent lengthwise of the shaft to compensate for dissipation of the energy of the flow.

This facilitates spalling of the dry product and invigorates the process of drying.

The Table hereinbelow represents conditions of arrangement of the mixer 9 on the shaft 10 in the chamber 1, and solubility of a milk substitute dried according to the proposed method.

TABLE

| Test No. 1 | Angle of mixer shaft to the axis of the chamber, degrees 2 | Distance from chamber axis to the shaft of the mixer, m 3 | Distance from the mesh to the mixer shaft, m 4 | Diameter of the mixer blades, m 5 | Solubility of dried milk substitute in ml of wet sediment 6 |
| --- | --- | --- | --- | --- | --- |
| 1 | 0   | 0.50 | 0.50 | 0.20 | 2.20 |
| 2 | 30  | 0.50 | 0.60 | 0.30 | 1.60 |
| 3 | 60  | 0.60 | 0.65 | 0.40 | 0.80 |
| 4 | 80  | 0.70 | 0.70 | 0.45 | 0.78 |
| 5 | 90  | 0.75 | 0.75 | 0.50 | 0.78 |
| 6 | 90  | 0.80 | 0.80 | 0.60 | 1.68 |
| 7 | 100 | 0.80 | 0.80 | 0.70 | 1.80 |

It follows from the above table that at the angle of less than 60° the quality of an product deteriorates sharply.

This is because the flow of heat-transfer agent downstream of the mixer 9 is redestributed so that its velocity equalizes cross-wise, and the force of impact of the inert bodies against the mesh 8 is insufficient for spalling of the dry product. Therefore, the product remains to dwell in the drying zone, whereby its quality is affected.

An increase in the angle to over 90° results in that the blades of the mixer 9 act to direct the flow downwards thus disturbing the stability of spraying of the thermosensitive material onto the inert bodies.

The arrangement of the shaft 10 of the mixer 9 at a distance of 0.6–0.7 R from the axis of the chamber 1, and 0.65–0.75 R to the mesh 8 at a diameter of the blades of the mixer 0.4–0.5 R determines the travel path of the inert bodies in the part of the volume of the upper zone of the flow of heat-transfer agent.

In this travel path the product is chipped off the inert bodies because these bodies collide with each other and with the wall of the chamber 1.

A reduction in the distance from the mixer to the wall of the chamber 1 or to the mesh 8 makes this travel path shorter to result in incomplete spalling of the dry product and the tendency of the product to overheat. Conversely, an increase in this distance causes redestribution of the flow, whereby the inert bodies are delivered to the mesh 8 at velocities insufficient for providing an impact power thereagainst for spalling the remainder of the dry product, which also affects the quality of the dry product.

This invention can find application in the food industry, such as for making whey and blends, in microbiology for making fermentation preparations, in the chemical industry, medical practice, and elsewhere.

We claim:

1. A method of drying thermosensitive materials comprising the steps of spraying such materials onto inert bodies circulating about a closed space having upper and lower portions in a stream of a heat-transfer agent at an increased temperature, wherein the stream of heat-transfer agent in said upper portion of said closed space, occupying not more than ⅓ of its horizontal cross section, is rotated at an axial velocity 2 to 3 times higher than the velocity of the heat-transfer agent in the rest of the flow.

2. A method of drying thermosensitive materials as claimed in claim 1, wherein the flow of heat-transfer agent is fed at a rate of 21–27 m/s and a temperature of 220°–260° C., a temperature gradient lengthwise of the flow being maintained within a range of 120–⅛K/m.

3. A method of drying thermosensitive materials as claimed in claim 1, wherein the flow of heat-transfer agent is fed at a rate of 14–19 m/s and a temperature of 170°–190° C., a temperature gradient lengthwise of the flow being maintained within a range 90–120 K/m.

4. An apparatus for drying thermosensitive materials comprising a cylindrical chamber (1) having a longitudinal axis, an outlet pipe (7) and a tapered bottom (2) having walls and an upper portion, said bottom accommodating axially of the chamber (1) a blind tube (3) with a base (4) defining with the walls of the bottom (2) an axial passage (5) for introducing a heat-transfer agent thereto, and nozzle means (6) for feeding the thermosensitive material into said cylindrical chamber, a mesh (8) provided in said cylindrical chamber (1) at a side of said outlet pipe (7); and a propeller mixer (9) secured on a shaft (10) arranged between said tapered bottom and said mesh at an angle in the range of 60°–90° to said longitudinal axis at a distance from said axis which is less than R, where R is a radius of the chamber (1), said shaft always being directed in at least one of an upstream direction and a direction along a plane normal to said longitudinal axis.

5. An apparatus as claimed in claim 4, in which the shaft of the propeller mixer is spaced from the axis of the chamber at a distance of 0.6–0.7 R, whereas the distance from the shaft of the propeller mixer to the mesh is within 0.65–0.75 R, the blades of the propeller mixer having a diameter of 0.4–0.5 R.

6. An apparatus as claimed in claim 4, in which several additional propeller mixers on additional shafts are arranged under a mesh about the perimeter of the cylindrical chamber.

7. An apparatus as claimed in claim 6, in which two propeller mixers are mounted on each shaft.

8. A method of drying thermosensitive materials as claimed in claim 1 wherein the inert bodies, amounting to a volumetric fraction of 0.2–0.25, are circulated for a time of circulation within a range of 2.0–3.0 seconds.

9. A method of drying thermosensitive materials as claimed in claim 2 wherein the inert bodies, amounting to a volumetric fraction of 0.2–0.25, are circulated for a time of circulation within a range of 2.0–3.0 seconds.

10. A method of drying thermosensitive materials as claimed in claim 3 wherein the inert bodies, amounting to a volumetric fraction of 0.2–0.25, are circulated for a time of circulation within a range of 2.0–3.0 seconds.

11. An apparatus as claimed in claim 4 in which the nozzles for feeding the thermosensitive material are arranged about a perimeter of the tapered bottom at the upper portion thereof.

12. An apparatus as claimed in claim 5 in which the nozzles for feeding the thermosensitive material are arranged about a perimeter of the tapered bottom at the upper portion thereof.

* * * * *